United States Patent [19]

Inose et al.

[11] 3,790,715

[45] Feb. 5, 1974

[54] DIGITAL TRANSMISSION TERMINAL FOR VOICE AND LOW SPEED DATA

[75] Inventors: Hiroshi Inose, Tokyo; Yutaka Masuko, Kawasaki; Tadao Saito, Tokyo, all of Japan

[73] Assignee: Bell Telephone Laboratories, Incorporated, Murray Hill, N.J.

[22] Filed: July 28, 1972

[21] Appl. No.: 276,082

[52] U.S. Cl. ...... 179/15 BV, 179/15 A, 179/15 AS, 179/15 BA, 179/15 BY

[51] Int. Cl. ........ H04j 3/16

[58] Field of Search.....179/15 AS, 15 BY, 15 BA, 179/15 BV, 179/15 BW, 15 AL

[56] References Cited

UNITED STATES PATENTS

| | | | |
|---|---|---|---|
| 3,660,606 | 5/1972 | DeWitt | 179/15 BA |
| 3,692,942 | 9/1972 | Inose | 179/15 A |
| 3,708,786 | 1/1973 | Hardin | 179/15 BV |
| 3,529,089 | 9/1970 | Davis | 179/15 AL |
| 3,668,645 | 6/1972 | Reymond | 179/15 AS |
| 3,644,680 | 2/1972 | Amano | 179/15 AS |
| 3,715,507 | 2/1973 | Oshima | 179/15 BY |
| 3,665,405 | 5/1972 | Sanders | 179/15 BV |
| 3,562,433 | 2/1971 | Ambrosio | 179/15 A |

OTHER PUBLICATIONS

Transmission Systems for Communications, Bell Telephone Laboratories, Inc., 4th Edition, February 1970, pp. 553–565.

*Primary Examiner*—Kathleen H. Claffy
*Assistant Examiner*—David L. Stewart
*Attorney, Agent, or Firm*—John C. Albrecht

[57] ABSTRACT

Apparatus for multiplexing a plurality of speech and low speed data signals on a single data multiplex channel. In order to accommodate the low speed data signals, a time slot of the recurring time multiplex transmission scheme of the time multiplex transmission channel is organized into a plurality of basic data channels corresponding in number to the number of bits which occur in the time slot. Control circuitry is provided for assigning one or more low speed data signal sources to a basic data channel during frames of the recurring cycle. The frame assignment is dependent on the signaling rate of the assigned data signal source. A control register is associated with each low speed data signal source and in order to minimize register size each control register is arranged to store a first set of signals defining one-out-of-*n* bit times in a coded form where *n* bit times occur in each time slot, a second set of signals defining one-out-of-*m* frames in a recurring sequence of *m* frames and to store a third set of signals which define the data rate of the corresponding data signal source.

2 Claims, 6 Drawing Figures

DIGITAL TRANSMISSION TERMINAL FOR VOICE AND LOW SPEED DATA

FIELD OF THE INVENTION

This invention relates to digital systems for multiplexing low speed digital data and other digital signals, e.g., signals representative of speech.

BACKGROUND OF THE INVENTION

It has long been recognized that it is advantageous from a noise standpoint to encode voice signals into a digital form for transmission between switching centers. Furthermore, where digital signals are utilized it is advantageous to time multiplex such signals on a relatively wide bandwidth transmission channel. A prior art communication system which utilized pulse code modulation encoding of speech signals and time division multiplexing of such PCM signals is shown in U.S. Pat. No. 2,957,949 which issued on Oct. 25, 1960. That prior art switching system is arranged to serve a plurality of voice customers which terminate on each of a plurality of line concentrators and that system utilizes one bit of each 8-bit time slot as a mechanism for transmitting supervisory scanning information from a remote concentrator to the central office.

With the advent of a requirement for the transmission of large amounts of business data, it has become known in the literature to commingle digital data signals from data sources and pulse coded signals representative of voice signals on a common transmission path. However, it has been customary to "steal" a bit of time slot for data transmission while degrading the encoding of the voice signal to the time slot or to dedicate an entire time slot to a single data transmission. The bandwidth which is necessary for the transmission of digital signals representative of speech is greater than the bandwidth which is necessary to transmit individual low speed data signals, therefore, the dedication of a time slot to the transmission of a single low speed data signal is wasteful of the transmission system bandwidth. For example, where 8,000 hertz sampling of speech is utilized and the speech is encoded in an 8-bit code, a single time slot will accommodate 64 kilohertz of data. Low speed data signal sources, on the other hand, typically have transmission rates ranging from 500 hertz to 8,000 hertz.

SUMMARY OF THE INVENTION

In accordance with the present invention, a time slot of a recurring time multiplex transmission system is organized into a plurality of basic data channels corresponding in number to the number of bits which occur in the time slot; and control circuitry is provided for assigning one or more low speed data signal sources to the basic data channels during frames of a recurring cycle of frames, the frame assignments being dependent of the signaling rate of the assigned data signal sources.

Advantageously, in accordance with these arrangements transmission channel bandwidth is more fully utilized and the control and administration of assignment of signaling sources to transmission channels is simplified. This invention will be understood from the following description with respect to the drawing in which.

DESCRIPTION OF THE ILLUSTRATIVE EMBODIMENT

Figure 1:
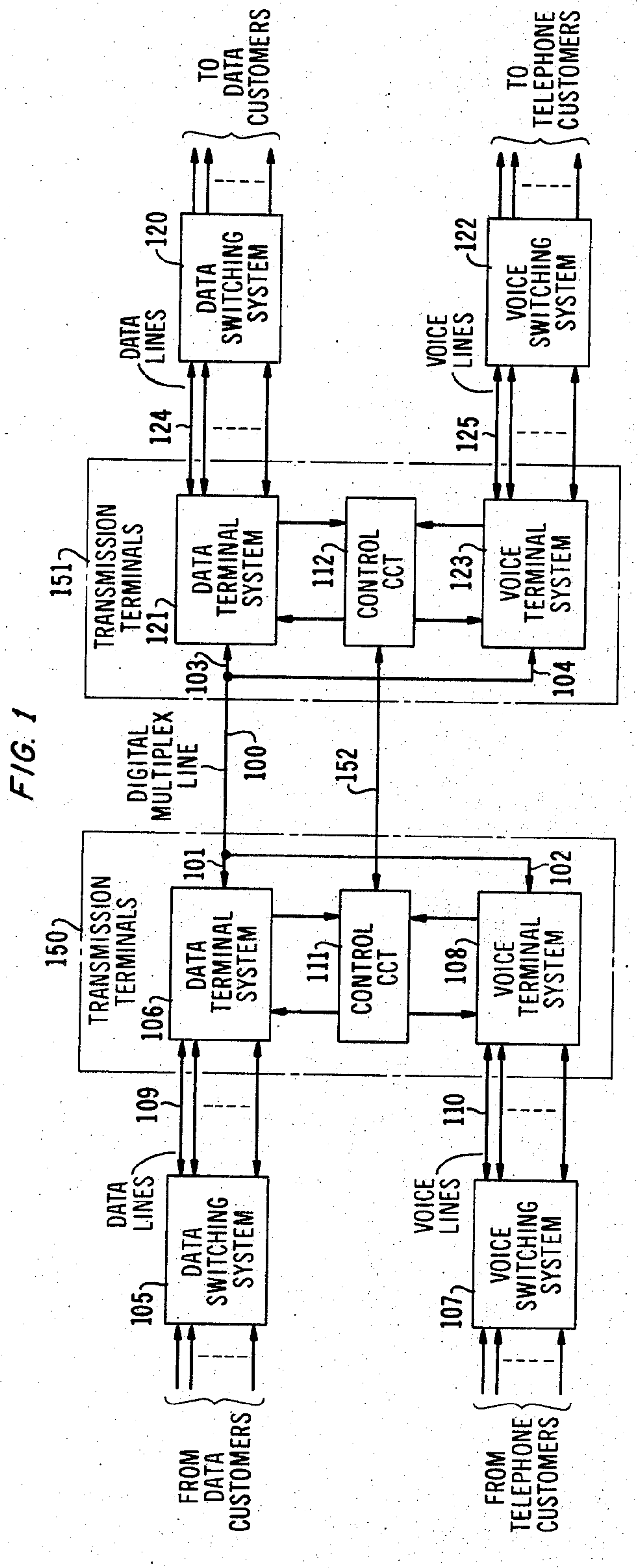
FIG. 1 is a block diagram of a two-terminal PCM transmission system arranged to serve voice and data customers.

An illustrative embodiment of a two-terminal pulse code modulation transmission system in which the present invention may be practiced to advantage is shown in FIG. 1. The digital multiplex line 100 connects the two terminals 150, 151 for bidirectional communication. In this illustrative embodiment, the line 100 serves twenty-four 8-bit time slots in a frame which has a time duration of 125 milliseconds. A priorly known communication system which utilizes such a timing cycle and information format is shown in U. S. Pat. No. 2,957,949 which issued on Oct. 25, 1960. That prior art switching system is arranged to serve a plurality of voice customers which terminate on each of a plurality of line concentrators. This prior art switching system utilizes one bit of each 8-bit time slot as a mechanism for transmitting supervisory scanning information from a remote concentrator to the central office.

In the illustrative system of FIG. 1, it is contemplated to provide service interconnecting a relatively large plurality of data signal sources and loads, e.g., 109, 124, while accommodating digital signals representative of speech for voice lines 110, 125. In the illustrative embodiment, the data signals have the following transmission rates: 500 hertz, 1,000 hertz, 2,000 hertz, 4,000 hertz, and 8,000 hertz. The utilization of these frequencies in the illustrative embodiment illustrates the principles of the present invention without intending to limit the application thereof. The data switching systems 105, 120 and the voice switching systems 107, 122 are shown in FIG. 1 to illustrate the utilization of the transmission system.

Figure 2:
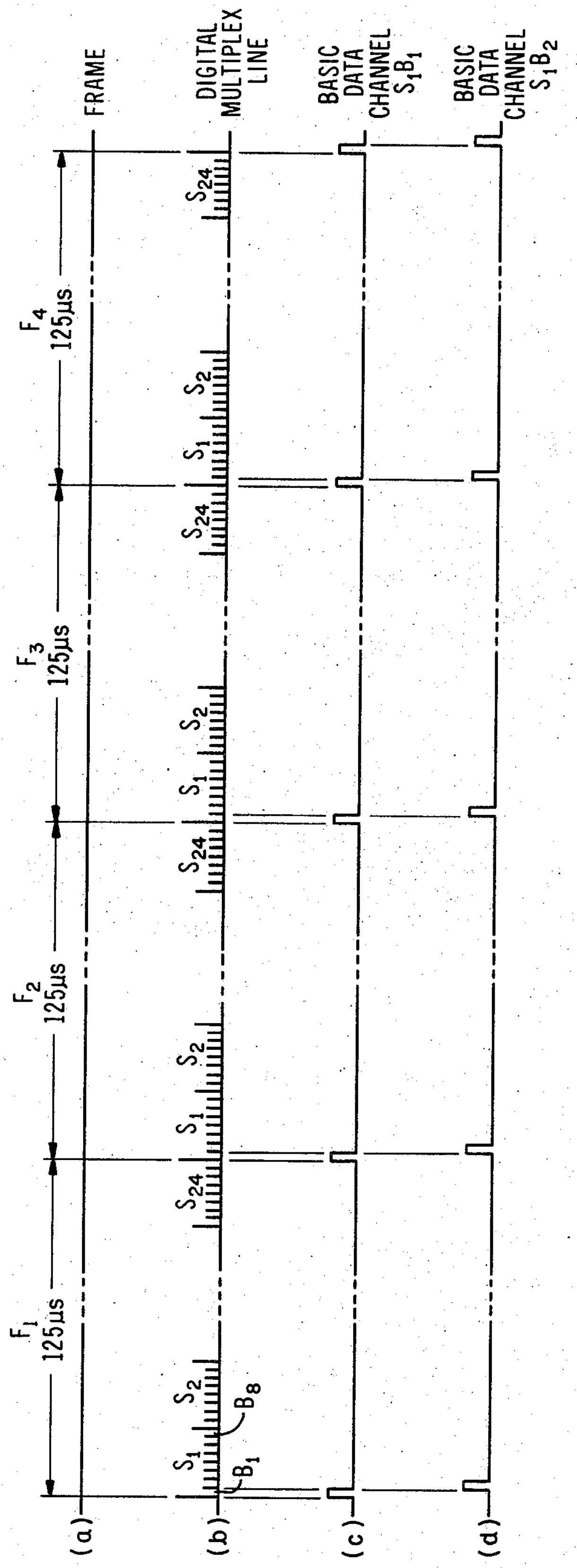
FIG. 2 is a time diagram showing the allocation of time to basic data channels.

In FIG. 2, line (*a*), there are shown four successive information frames F1 through F4 which occur on the PCM line 100. The frames occur at the rate of 8,000 cycles per second and the pulse rate on the PCM line 100 is 1.536 megahertz. These timing arrangements are accommodated to the transmission of speech signals having a usable frequency range below 4,000 hertz.

For the transmission of low speed data, in accordance with the present invention, the 8-bit times of a time slot are assigned to a corresponding eight "basic data channels." Accordingly, in the system of the illustrative embodiment, each basic data channel will accommodate 8 kilohertz of data. A time slot need not be reversed for the transmission of data, but rather any time slot may be utilized for the transmission of low speed data. With this flexibility of choice, low speed data can be handled with greater reliability since the transmission thereof does not rely upon the continuing good operating conditions of a specific time slot.

Service for low speed data signal sources can be provided by any arbitrary assignment of basic data channels, however, at time when there is a substantial amount of data traffic to be handled, improved performance can be achieved by an orderly assignment of data signal sources to the basic data channels within the framework of a chosen plan. Failure to follow an orderly plan and to assign the bandwidth of the basic data channels to the various low speed data signal sources in a completely random or arbitrary manner may be wasteful of bandwidth and may unnecessarily limit the number of data signal sources which can be served simultaneously.

It is self-evident that one basic data channel can handle one 8 kilohertz signal source or any combination of low speed signal sources for which the sum of the signaling rates is 8,000. For example, a basic data channel will accommodate 16 500 hertz data signal sources. By way of further example, a basic data channel will simultaneously serve four 1,000 hertz data signal sources, one 2,000 hertz data signal source, or four 500 hertz data signal sources.

Although combinations of data signal source rates, such as are shown by way of example above, may be combined to utilize a single basic data channel, it is advantageous from the standpoint of system administration and utilization of available bandwidth to assign signal sources having the same signaling bit rate to common basic data channel. For example, it is advantageous to assign signal sources having a 500 hertz rate to one basic data channel while assigning signal sources having a 1,000 hertz rate to a second basic data channel and to follow a similar plan with respect to the 2,000 hertz and 4,000 hertz signal sources.

Furthermore, it is advantageous to dynamically reassign transmission capacity to minimize blocking of service for requests, particularly during periods of high traffic. For example, assuming that one basic data channel is serving eight 1,000 hertz data signal sources and another 1,000 hertz data signal source is served by a second basic data channel, it is advantageous to reassign the 1,000 hertz signal source from the second basic data channel to the first basic data channel if one of the 1,000 hertz signal sources served by the first basic data channel no longer requires service.

This application is concerned with the utilization of transmission time on the PCM line 100 to provide service for low speed data channels and the details of the voice terminal system 108, 123 are not essential to an understanding of this invention. However, it is assumed that there are control circuits 111, 112 for coordinating between the data terminal system 106 and the voice terminal system 108 the utilization of the time available on the digital multiplex line 100. Similarly, for the transmission terminal 151 there is a control circuit 112 for coordinating the control operations of the data terminal system 121 and the voice terminal system 123.

Figure 3:
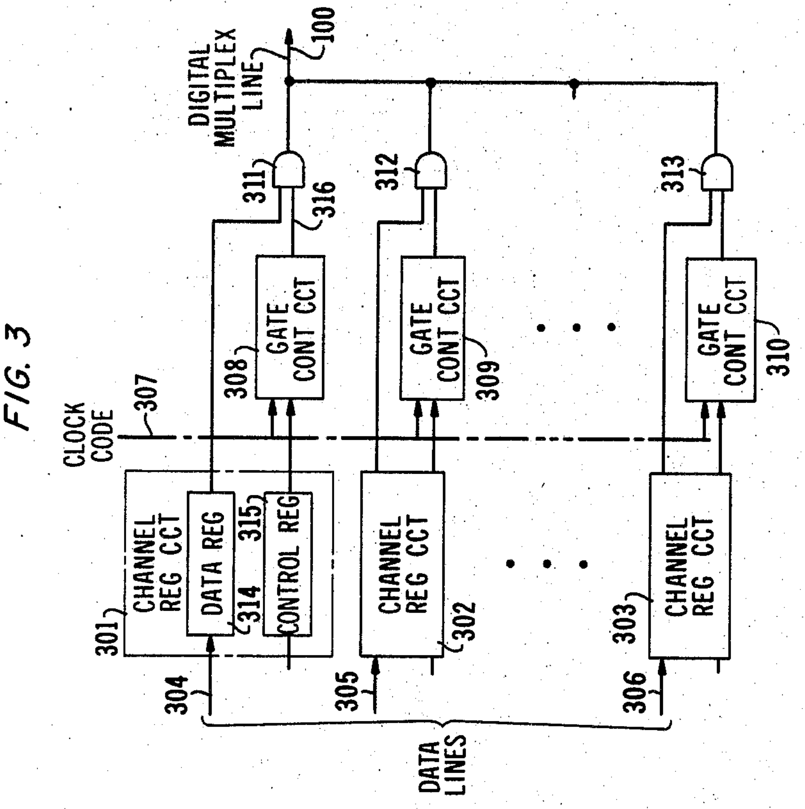
FIG. 3 is a schematic diagram of an arrangement for multiplexing data in accordance with this invention.

FIG. 3 shows in schematic form the arrangements for gating data from data lines, e.g., 304 (corresponds to data line 109 in FIG. 1) and the digital multiplex line 100. Digital data on the data line 304 is placed in the data register 314 serially and is gated to the digital multiplex line 100 through its associate gate 311 under the control of output signals of the gate control circuit 308. The input signals to the gate control circuit 308 comprise the contents of the control register 315 and the clock code signals on the clock code cable 307. A more detailed showing of a control register, e.g., register 315, and a gate control circuit, e.g., gate control circuit 308, is given in FIG. 4.

Figure 4:
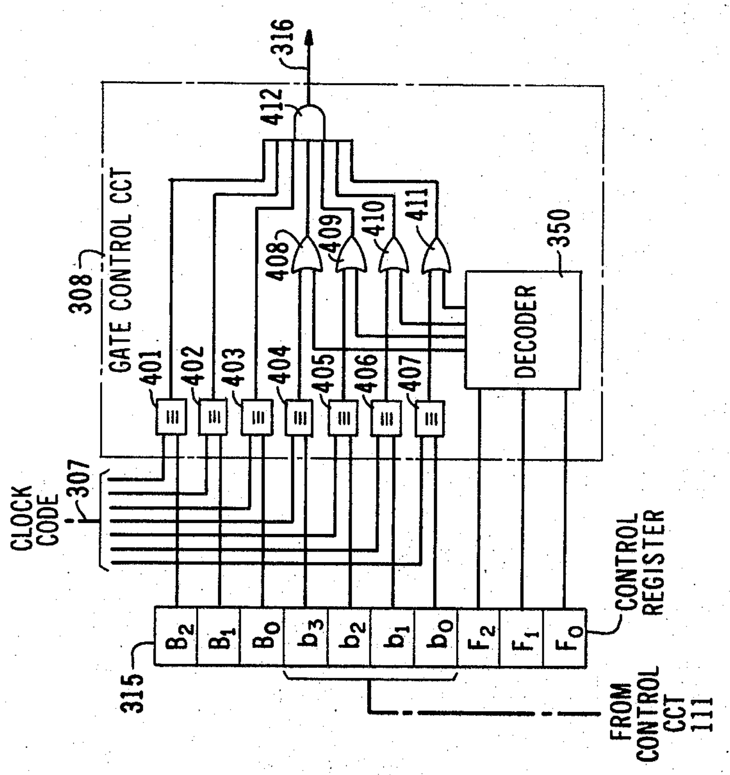
FIG. 4 is a circuit diagram of designated portions of FIG. 3.

As shown in FIG. 3, the channel register circuits 301, 302, 303 are associated on a one-for-one basis with the data signal sources 304, 305, 306. For the purpose of illustration only, FIGS. 3 and 4 provide for the transmission of data in one direction only. However, similar control circuit arrangements are utilized for the transmission of data in the opposite direction. That is, since the digital transmission line 100 is assumed to be a bidirectional line it is contemplated that the transmission terminals 150, 151 will serve bidirectional data transmission. The control circuitry for demultiplexing data on the digital multiplex line 100 at the transmission terminal 151 is the mirror image of the arrangements of FIG. 3. Without delving into the details thereof, it is assumed that digital data received over the digital multiplex line 100 is retimed before entering the data terminal system 121 or the transmission delay between the data terminal 106, and the data terminal 121 is an interval multiple of a basic data channel frame cycle comprising 16 frames. Alternatively, in the absence of such delay relationship, it is assumed that the timing of control functions at the transmission terminals 150, 151 are coordinated. Since the control register, e.g., 315 is associated with a data line, e.g., 304 it is possible to identify the times at which data originating with that data line are to be transmitted to the digital multiplex line 100 by an efficient 10-bit code. This coding assumes that for purposes of illustration only one time slot is reserved for low speed data transmission and that the control arrangements 111, 112 have this information stored in semipermanent form. Under this assumption there is a need only to identify the basic data channel, the bit time within the basic data channel, and the frames within the frame cycle which are to be utilized for transmission of data from the associated data line, e.g., 304. The bits B0, B1 and B2 in the control register 315 are utilized in straight binary coded form to identify the one-out-of-eight basic data channels being utilized to serve the associated data signal source. The bits labeled b0, b1, b2, b3 identify the frame to be used in the frame cycle and the bits labeled F0, F1, F2 define the signaling rate of the data on the associated data line. It has been assumed that the data lines have one of the prescribed data signaling rates, namely, 500 hertz, 1,000 hertz, 2,000 hertz, 4,000 hertz, and 8,000 hertz. Accordingly, the three bits, F0 through F2, are capable of defining these five rates when utilized in straight binary coded form.

The signals on the clock code cable 307 occur on the seven conductors which make up that cable in accordance with the timing shown in FIG. 2. The comparison circuits 401 through 407 each compare signals from a conductor of the clock code cable and the output conductor from the corresponding bit position of the control register 315. At the times that there is full agreement between the signals on the individual conductors of the clock code cable 307 and the output conductors of the corresponding bit positions of the control register 315, the comparision circuits 401 through 407 generate output signals which are utilized to gate information from a corresponding data register, e.g., 314 through a transmission gate 311 to the digital multiplex line 100. As previously explained, a frame cycle of 16 frames is utilized to accommodate the transmission of data signals from up to sixteen 500 hertz data signal sources. In the cases in which 500 hertz data signals are being transmitted, the output gate, e.g., 311 associated with that 500 hertz data signaling source is enabled once during a cycle of 16 frames. In the event that a 1,000 hertz data signal is being transmitted, the output gate, e.g., 312 must be enabled during two frames of a 16-frame cycle; and if an 8,000 hertz signal is being transmitted, the associated output gate must be enabled during each frame of a 16-frame cycle. Since a control register is associated with a signal source as opposed to being associated with a frame of a 16-cycle frame, the coding of information in the control register 315 must provide for the recurrent enabling of the associated output gate, e.g., 311 during evenly spaced frames of the 16-frame cycle. To accomplish this goal the bits in the control register 315 labeled F0, F1 and F2 are decoded by the decoder 350 to enable the associated output gates at multiples of the frame time represented by the code comprising *b*0 through *b*3. With the assumption that bit b. is the lowest ordered bit of the code and bit *b*3 is the highest ordered bit of the code, multiple operations of the associated output gate may be achieved by ignoring bits *b*3, *b*2 and *b*1 selectively. When the content of bit *b*3 is ignored, while retaining the effect of the coding of the bits *b*2 through *b*0, the output gate, e.g., 311 is enabled during two frames of a 16-frame cycle. Similarly, when the two bits *b*3 and *b*2 are both ignored and the effect of the coding of the remaining bits *b*1 and *b*0 is retained, the associated output gate will be enabled during four frames of a 16-frame cycle. Accordingly, the encoding of the bits F0 through F2 which serves to generate output signals of the decoder 350 such that the OR gate 408 is enabled independently of a match between the clock code and the signal at the output of the register stage *b*3, a 1,000 hertz data signal source is indicated. Similarly, when the output gate 311 is enabled during four frames due to the coding of the bits F0 through F2, it is indicated that the signal source is a 2,000 hertz data signal source. Similarly, the coding of the bits F0 through F2 serves to effect transmission during eight and during 16 frames of the 16-cycle frame to transmit a 4,000 hertz and an 8,000 hertz data signal, respectively.

For the sole purpose of illustrating the principles of this invention the arrangements of FIGS. 3 and 4 do not include details of the timing of the gating of information onto and from the digital multiplex line 100. It is assumed that the introduction of timing pulses to create appropriate windows at the sending and receiving terminals is easily within the reach of one skilled in the art and is not essential to an understanding of the present invention.

Figure 5:
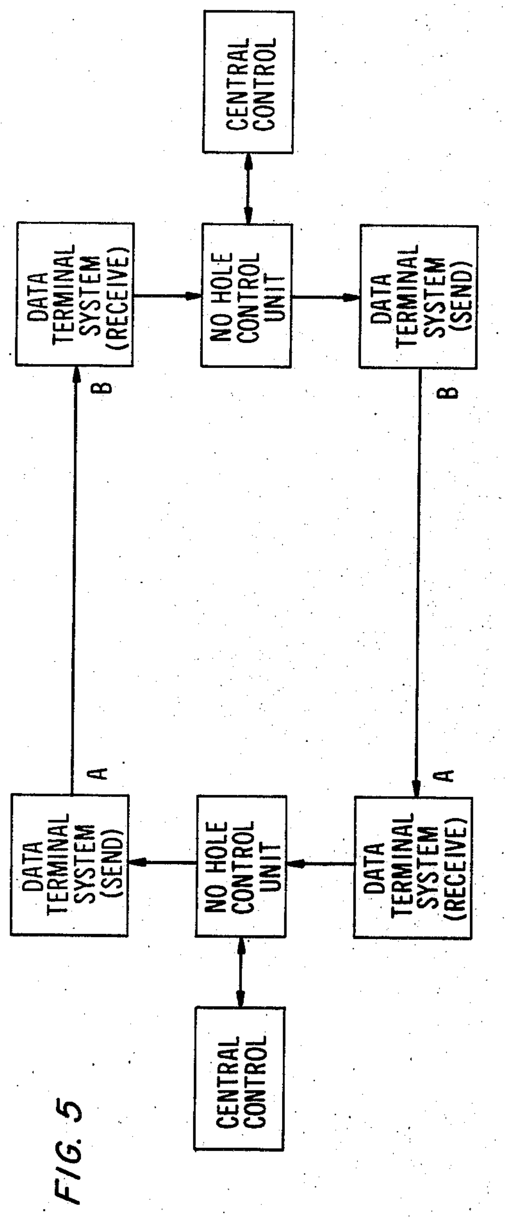
FIG. 5 is a schematic diagram of a control arrangement for communicating between transmission terminals to coordinate channel transfer.
Figure 6:
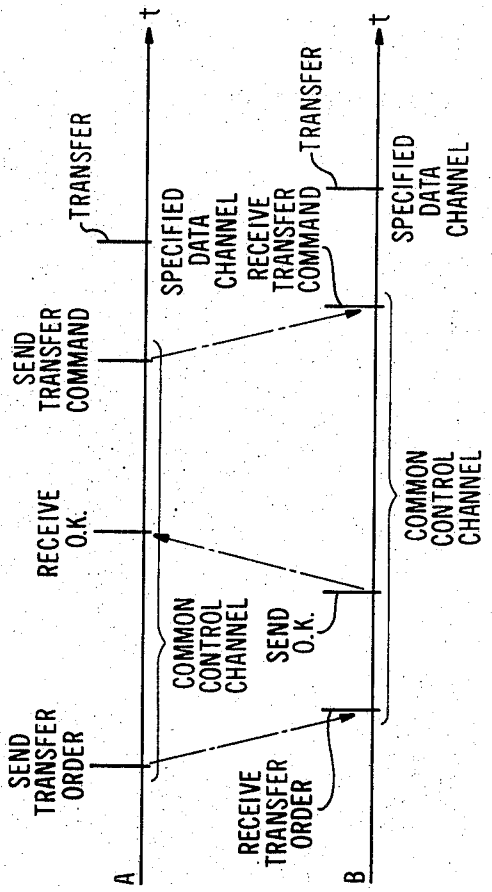
FIG. 6 is a time diagram illustrating the timing of control signals for the arrangement of FIG. 5.

Advantageously, the association of the control register with a data signal source and the utilization of the coding scheme described above herein offers a substantial advantage over other possible arrangements wherein a control register is provided for each frame of a 16-frame cycle. With the arrangements disclosed herein the administration of time slot assignment within the basic data channels is improved. Furthermore where, as shown in FIGS. 5 and 6, it is desirable to coordinate the dynamic reassignment of frames within the basic data channels, the particular 10-bit coding is efficient and advantageous. For the purpose of dynamically reallocating time within a basic data channel it is assumed that one of the two transmission terminals 150, 151 must assume control to initiate reswitching. For th purpose of illustrating this invention there is shown a control transmission path 152 between the control circuits 111, 112 of the transmission terminals 150, 151. It is assumed that the transmission delay on the channel 152 is equal to the transmission delay on the digital multiplex line 100. Should this relationship not exist, one may adjust the timing of actions to accommodate for any difference.

The switching of a connection between a data source and a data load from one basic data channel to another basic data channel must be accomplished in a manner which avoids the dropping of data bits from the information transmitted and the introduction of unwanted data bits. For purposes of illustration only it is assumed that the control circuit 111 within the transmission terminal 150 monitors the utilization of the basic data channels and initiates the switching of assignments of data signal sources to those basic data channels when conditions dictate switching in order to free a basic data channel or a portion thereof for other service. Having determined that switching is to take place, the control unit 111 must generate signals which will effect the reassignment at both ends of the transmission arrangement. As shown in FIG. 6, the control unit 111 sends a transfer order to the control unit 112 at the other transmission terminal and awaits the receipt of a signal from that other transmission terminal 151 that the time proposed to be utilized by the signal source to be transferred is, in fact, available at that other terminal. After receipt of such acknowledgment the control circuit 111 generates signals to effect the change at its associated terminal and to generate signals ordering a corresponding change at the distant transmission terminal. The actual changes being carried out at the two terminals are such that there is no loss of data between the signal source which has been assigned a different time within a basic data channel and the connected receiving terminal. Advantageously, the signal which is transmitted from a switch originating transmission terminal, e.g., 150 may be transmitted to the other transmission terminal 151 in the simplified, previously described 10-bit code.

What is claimed is:

1. Terminal apparatus for a digital transmission system comprising a digital communication channel for interconnection of the terminal apparatus to other terminal apparatus; timing means for generating timing signals for defining recurring sequences of *m* timing frames each, each frame comprising a plurality of word times and each word time comprising *n* bit times; a plurality of digital word signal sources for providing digital word signals, first connecting means for selectively connecting the digital word signal sources to the digital communication channel under the control of control signals; a plurality of low speed data signal sources, second connecting means for selectively connecting the low speed data signal sources to the digital communication channel under the control of further control signals; and first control means for generating the control signals so that the digital word sources are connected to the digital communication channel for selected word times of each frame of a sequence of frames; and a plurality of second control means associated on a one-for-one basis with said low speed data signal sources for generating the further control signals for selectively connecting the low speed data signal sources to the digital communication channel during assigned single bit times of assigned frames of the recurring sequences of $m$ frames, each of said second control means comprises: a control register for storing coded control signals defining the bit times during which signals from the associated low speed data signal sources are to be transmitted to the digital communication channel and frames during which the associated low speed data signal sources are to be connected to the digital communication channel and each said second control means is responsive to said timing signals and to information stored in the associated control register for generating the further control signals.

2. Terminal apparatus in accordance with claim 1 wherein the control register is arranged to store a first set of signals defining one-out-of-$n$ bit times in a coded form, a second set of signals defining one-out-of-$m$ frames in the recurring sequence of $m$ frames per sequence and for storing a third set of signals defining the data rate of the corresponding low speed data signal source.

* * * * *

UNITED STATES PATENT OFFICE
CERTIFICATE OF CORRECTION

Patent No. 3,790,715 Dated February 5, 1974

Inventor(s) Hiroshi Inose, Yutaka Masuko, and Tadao Saito

It is certified that error appears in the above-identified patent and that said Letters Patent are hereby corrected as shown below:

Column 1, line 17, "which utilized pulse" should read --which utilizes pulse--. Column 1, line 60, "dependent of the" should read --dependent on the--. Column 2, line 64, "be reversed for" should read --be reserved for--. Column 3, line 20, "16 500 hertz" should read --sixteen 500 hertz--. Column 3, line 30, "to common basic" should read --to a common--. Column 5, line 23, "bit b. is" should read --bit b0 is--. Column 6, line 5, "for th purpose" should read --for the purpose--.

Signed and sealed this 30th day of July 1974.

(SEAL)
Attest:

McCOY M. GIBSON, JR.
Attesting Officer

C. MARSHALL DANN
Commissioner of Patents